(12) United States Patent
Xu et al.

(10) Patent No.: US 11,897,907 B2
(45) Date of Patent: Feb. 13, 2024

(54) METHOD FOR PREPARING GLUFOSINATE OR ANALOGUES THEREOF (71) Applicant: LIER CHEMICAL CO., LTD., Mianyang (CN)

(72) Inventors: Min Xu, Chengdu (CN); Yongjiang Liu, Chengdu (CN); Lei Zhou, Chengdu (CN); Wei Zeng, Chengdu (CN); Ke Cheng, Chengdu (CN)

(73) Assignee: LIER CHEMICAL CO., LTD., Mianyang (CN)

( * ) Notice: Subject to any disclaimer, the term of this patent is extended or adjusted under 35 U.S.C. 154(b) by 0 days.

(21) Appl. No.: 18/301,679

(22) Filed: Apr. 17, 2023

(65) Prior Publication Data
US 2023/0257405 A1    Aug. 17, 2023

Related U.S. Application Data (63) Continuation of application No. PCT/CN2022/106399, filed on Jul. 19, 2022.

(51) Int. Cl.
*C07F 9/30* (2006.01)

(52) U.S. Cl.
CPC .................................. *C07F 9/301* (2013.01)

(58) Field of Classification Search
CPC .......... C07F 9/301; C07F 9/4006; C07F 9/42; C07F 9/52; C07F 9/32; C07F 9/46; Y02P 20/55; C07C 229/20
See application file for complete search history.

(56) References Cited

FOREIGN PATENT DOCUMENTS

| WO | 2021147894 | | 7/2021 | |
|---|---|---|---|---|
| WO | WO-2021147894 A1 | * | 7/2021 | .............. C07F 9/301 |
| WO | 2022077989 | | 4/2022 | |

* cited by examiner

*Primary Examiner* — Deborah D Carr
(74) *Attorney, Agent, or Firm* — Robin L. Teskin; Baker, Donelson, Bearman, Caldwell & Berkowitz PC (57) ABSTRACT The present invention relates to a method for preparing glufosinate or analogues thereof.

21 Claims, 2 Drawing Sheets

METHOD FOR PREPARING GLUFOSINATE OR ANALOGUES THEREOF

CROSS-REFERENCE TO RELATED APPLICATIONS

This application is a continuation application of Int'l Appl. No. PCT/CN2022/106399, filed Jul. 19, 2022, which claims priority to Chinese application no. 202110817871.2 filed Jul. 20, 2021, each and all of which are incorporated herein by reference in their entireties.

FIELD OF THE INVENTION

The present invention relates to a method for preparing glufosinate or analogues thereof.

BACKGROUND OF THE INVENTION

Glufosinate is an important herbicide.

SUMMARY OF THE INVENTION

The present invention provides a method for preparing glufosinate or analogues thereof, in particular, a method for preparing glufosinate of formula (I) or analogues thereof in a continuous manner. The continuous preparation method of the present invention can simplify production without separating intermediates, improve the production efficiency, and reduce the production costs. The method of the present invention is carried out in a continuous manner, and is especially suitable for preparing L-glufosinate at low costs.

In a first aspect, the present invention provides a method for preparing glufosinate of formula (I) or analogues thereof, (I)

characterized in that, the method comprises:
a) feeding a compound of formula (II) and a compound of formula (V) into a first reactor set, after reaction, a product stream of the first reactor set is obtained, (II)

(V)

b) feeding the product stream of the first reactor set into a second reactor set, reacting at a temperature in the range of from 50° C. to 200° C., preferably from 80° C. to 130° C., to obtain a product stream of the second reactor set; and c) subjecting the product stream of the second reactor set to an acidic hydrolysis or a basic hydrolysis to obtain the glufosinate of formula (I) or analogues thereof;

wherein X represents $-OR_2$ or $-NR_2R'$, $R_1$, $R_2$ and $R_7$ are each independently selected from a substituted or unsubstituted hydrocarbyl group, such as a substituted or unsubstituted alkyl group, a substituted or unsubstituted aryl group, a substituted or unsubstituted cycloalkyl group, a substituted or unsubstituted alkaryl group, and a substituted or unsubstituted aralkyl group;

for example, $R_1$, $R_2$ and $R_7$ are each independently selected from a substituted or unsubstituted $C_1$-$C_6$ alkyl group, a substituted or unsubstituted $C_6$-$C_{12}$ aryl group, a substituted or unsubstituted $C_3$-$C_{10}$ cycloalkyl group, a substituted or unsubstituted $C_7$-$C_{12}$ alkaryl group, and a substituted or unsubstituted $C_7$-$C_{12}$ aralkyl group;

for example, $R_1$, $R_2$ and $R_7$ are each independently selected from methyl, ethyl, propyl, isopropyl, butyl, isobutyl, pentyl, hexyl, phenyl, phenylmethyl, phenylethyl, phenylpropyl, methylphenyl, ethylphenyl, and propylphenyl;

for example, $R_1$ is selected from methyl and ethyl, and $R_2$ is selected from methyl, ethyl, propyl, isopropyl, butyl and isobutyl;

R' is hydrogen or has the same definition as $R_2$;

$Hal^1$ and $Hal^2$ are each independently halogen, preferably chlorine;

PG is hydrogen or an amino protecting group, and when PG is the amino protecting group, a step of removing the amino protecting group is further comprised.

In a second aspect, the present invention provides a method for preparing glufosinate of formula (I) or analogues thereof, (I)

characterized in that the method comprises:
$a_0$) feeding a compound of formula (III) and a compound of formula (IV) into a $A_0$ reactor set, after reaction, a product stream of the $A_0$ reactor set is obtained, (III)

(IV)

a) feeding the product stream of the $A_0$ reactor set and a compound of formula (V) into a first reactor set, after reaction, a product stream of the first reactor set is obtained, (V)

b) feeding the product stream of the first reactor set into a second reactor set, reacting in the second reactor set at a temperature in the range of from 50° C. to 200° C., preferably from 80° C. to 130° C., to obtain a product stream of the second reactor set; and c) subjecting the product stream of the second reactor set to an acidic hydrolysis or a basic hydrolysis to obtain the glufosinate of formula (I) or analogues thereof;

wherein $R_1$ is $R_5$ or $R_6$; and X represents —$OR_2$ or —$NR_2R'$, $R_2$, $R_3$, $R_4$, $R_5$ and $R_6$ are each independently selected from a substituted or unsubstituted hydrocarbyl group, such as, a substituted or unsubstituted alkyl group, a substituted or unsubstituted aryl group, a substituted or unsubstituted cycloalkyl group, a substituted or unsubstituted alkaryl group, and a substituted or unsubstituted aralkyl group;

for example, $R_2$, $R_3$, $R_4$, $R_5$ and $R_6$ are each independently selected from a substituted or unsubstituted $C_1$-$C_6$ alkyl group, a substituted or unsubstituted $C_6$-$C_{12}$ aryl group, a substituted or unsubstituted $C_3$-$C_{10}$ cycloalkyl group, a substituted or unsubstituted $C_7$-$C_{12}$ alkaryl group, and a substituted or unsubstituted $C_7$-$C_{12}$ aralkyl group;

for example, $R_2$, $R_3$, $R_4$, $R_5$ and $R_6$ are each independently selected from methyl, ethyl, propyl, isopropyl, butyl, isobutyl, pentyl, hexyl, phenyl, phenylmethyl, phenylethyl, phenylpropyl, methylphenyl, ethylphenyl, and propylphenyl;

for example, $R_1$ is selected from methyl and ethyl, and $R_2$ is selected from methyl, ethyl, propyl, isopropyl, butyl and isobutyl;

R' is hydrogen or has the same definition as $R_2$;

$Hal^1$ and $Hal^2$ are each independently halogen, preferably chlorine;

PG is hydrogen or an amino protecting group, and when PG is the amino protecting group, a step of removing the amino protecting group is further comprised.

DETAILED DESCRIPTION OF THE INVENTION

All technical and scientific terms used herein have the same meaning as commonly understood by one of ordinary skill in the art to which the present invention pertains, unless defined otherwise. In case of conflict, the definitions in the present Description will control.

When an amount, a concentration, or other values or parameters are expressed in the form of a range, a preferable range, or a preferred value or an exemplary value, it should be understood that any ranges obtainable by combining any upper limit or lower limit or preferable value or exemplary value are also specifically disclosed equivalently. The numerical ranges recited herein are intended to include the endpoints of the ranges, as well as all integers and fractions within those ranges, unless otherwise indicated.

When the term"about" is used to describe a value or endpoints of ranges, it should be understood that it includes ±5% of the specific value or the endpoints involved, preferably ±3%, and more preferably ±1%. The numerical values mentioned in the present invention should be considered as being modified by "about", unless otherwise stated.

Definitions

The term "reactor set" as used herein consists of one or more reactors in which the reactors may each be the same or different and may be in series connection or in parallel. One reactor refers to one container unit in which reactants can react. In the case of microchannel reactors, one reactor may refer to one microchannel reaction module.

The term "microchannel reactor" as used herein refers to a continuous flow reactor of which the reaction channels have an equivalent diameter of millimeter-scale or less.

The term "tube reactor" as used herein refers to a continuous flow reactor of which the reaction channels are unfilled with fillers and have an equivalent diameter greater than that of "microchannel reactor" as described above. "Tube reactor" as used herein encompasses straight-tube reactors and various bent-tube reactors, such as coiled-tube reactors.

The term "tubular packed reactor" as used herein refers to a continuous flow reactor of which the reaction channels are packed with fillers and have an equivalent diameter greater than that of "microchannel reactor" as described above. "Tubular packed reactor" as used herein encompasses straight-tube packed reactors and various bent-tube packed reactors, such as coiled-tube packed reactors.

In the case of a continuous flow reactor, the term "residence time" as used herein refers to a period starting from mixing and reacting of various reactants participating in a reaction in a reactor until leaving the reactor after the reaction. The residence time can be calculated by the following method:

The residence time $T_s$ is calculated as follows:

$$T_s = \frac{V}{Q}$$

$$Q = \sum_i \frac{G_i}{\rho_i}$$

wherein: $T_s$—the residence time, second (s);
V—the total volume of the reactor, mL;
Q—the total volume flow rate of reaction materials, mL/min;
$G_i$—the mass flow rate of each reaction material, g/min;
$\rho_i$—the density of each reaction material, g/mL.

The term "amino protecting group" as used herein refers to a group which can be linked to nitrogen atom in an amino group to protect the amino group from participating in a reaction and can be easily removed in a subsequent reaction. Suitable amino protecting groups include, but not limited to, the following protecting groups: a group of formula —C(O)O—R, wherein R is, for example, methyl, ethyl, tert-butyl, benzyl, phenylethyl, $CH_2$=CH—$CH_2$—, and the like; a group of formula —C(O)—R', wherein R' is, for example, methyl, ethyl, phenyl, trifluoromethyl, and the like; a group of formula —SO$_2$—R", wherein R" is, for example, tolyl, phenyl, trifluoromethyl, 2,2,5,7,8-pentamethylchroman-6-yl-, 2,3,6-trimethyl-4-methoxybenzene, and the like; a group of formula —CR'''H—C(O)O—R, wherein R''' is, for example, —CH$_2$CH$_2$Cl, —CH$_2$Cl, —CH$_2$CH$_2$CH$_2$Cl, and the like.

The term "glufosinate of formula (I) or analogues thereof" used herein includes all chiral forms of the structures represented by formula (I) and all salt forms of the structures represented by formula (I).

In the present application, in the case of a continuous feeding, the molar ratio between the compounds, such as the molar ratio of the compound of formula (II) to the compound of formula (V), and the molar ratio of the compound of formula (III) to the compound of formula (IV), is achieved by calculating the molar flow rate ratio of adding materials, i.e., a ratio of the molar flow rates of the two substances per unit time. A molar flow rate ratio can be calculated by one of skilled in the art via multiplying the concentration (in mole) of each substance by its flow rate and then determining the ratio of the two resulting values. For example, if the compound of formula (II) is present in a solution at a concentration of 1 mmol/mL and fed at a flux of 1 mL/min, and the compound of formula (V) is present in a solution at a concentration of 2 mmol/mL and fed at a flux of 2 mL/min, the molar ratio of the compound of formula (II) to the compound of formula (V) is 1:4.

In the present application, when the molar ratios are related to bases, the moles of bases are deemed as the moles of basic equivalents. For example, when the base is Ba(OH)$_2$ and is present in a solution at a concentration of 1 mmol/mL and fed at a flux of 1 mL/min, and the compound of formula (II) is present in a solution at a concentration of 1 mmol/mL and fed at a flux of 1 mL/min, the molar ratio of the base to the compound of formula (II) is 2:1.

Method of the First Aspect

Step a) of the Method of the First Aspect

In step a) of the method of the first aspect, a compound of formula (II) and a compound of formula (V) are fed to a first reactor set, after reaction, a product stream of the first reactor set is obtained, wherein the feeding is preferably a continuous feeding.

In step a), the molar ratio of the compound of formula (V) to the compound of formula (II) may be 1:(0.8-10), e.g., 1:(1-3), such as 1:0.9, 1:1.0, 1:1.2, 1:1.5, 1:1.7, 1:2.0, 1:2.2, 1:2.5, 1:2.7, 1:3.0, 1:3.2, 1:3.5, 1:3.7, 1:4.0, 1:4.2, 1:4.5, 1:4.7, 1:5.0, 1:5.2, 1:5.5, 1:5.7, 1:6.0, 1:6.2, 1:6.5, 1:6.7, 1:7.0, 1:7.2, 1:7.5, 1:7.7, 1:8.0, 1:8.2, 1:8.5, 1:8.7, 1:9.0, 1:9.2, 1:9.5, 1:9.7.

When feeding continuously, the compounds of formula (II) and the compound of formula (V) may be fed into the first reactor set simultaneously, or the compound of formula (II) and/or the compound of formula (V) may be fed into the first reactor set in portions at different time points and/or at different feeding sites respectively, as long as flowing out of the first reactor set continuously after the reaction of the two in the first reactor set is completed.

The reaction of step a) may be carried out in a wide temperature range, e.g., in the range of −50° C. to 200° C., e.g., −20° C. to 20° C., such as −45° C., −40° C., −35° C., −30° C., −25° C., −20° C., −15° C., −10° C., −5° C., 0° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C.

The compounds of formulae (II) and (V) may be optionally precooled or preheated prior to entering into the first reactor set, thereby cooling or heating the streams of compounds of formulae (II) and (V) to a temperature close to or equal to the reaction temperature of step a). Any cooling or heating device known in the art may be employed as the precooling or preheating device.

The reaction time of step a) may be adjusted in a wide range, e.g., in the range of 1 second to 5 hours, such as 1 second, 2 seconds, 5 seconds, 7 seconds, 8 seconds, 9 seconds, 10 seconds, 13 seconds, 15 seconds, 18 seconds, 20 seconds, 23 seconds, 25 seconds, 28 seconds, 30 seconds, 33 seconds, 35 seconds, 38 seconds, 40 seconds, 43 seconds, 45 seconds, 48 seconds, 50 seconds, 53 seconds, 55 seconds, 58 seconds, 1 minute, 1.3 minutes, 1.5 minutes, 1.8 minutes, 2.0 minutes, 2.3 minutes, 2.5 minutes, 2.8 minutes, 3.0 minutes, 3.3 minutes, 3.5 minutes, 3.8 minutes, 4 minutes, 4.5 minutes, 5 minutes, 5.5 minutes, 6.0 minutes, 6.5 minutes, 7.0 minutes, 7.5 minutes, 8.0 minutes, 8.5 minutes, 9.0 minutes, 9.5 minutes, 10 minutes, 15 minutes, 20 minutes, 25 minutes, 30 minutes, 35 minutes, 40 minutes, 45 minutes, 50 minutes, 55 minutes, 1.0 hour, 1.5 hours, 2.0 hours, 2.5 hours, 3.0 hours, 3.5 hours, 4.0 hours, 4.5 hours.

The reaction time may be residence time in the case of continuous flow reactors such as microchannel reactors, tube reactors or tubular packed reactors.

In particular, when the first reactor set in step a) consists of microchannel reactors, the reaction time may be adjusted in the range of 1-300 seconds, e.g., 1-30 seconds, such as 1 second, 2 seconds, 5 seconds, 7 seconds, 8 seconds, 9 seconds, 10 seconds, 13 seconds, 15 seconds, 18 seconds, 20 seconds, 23 seconds, 25 seconds, 28 seconds, 30 seconds, 33 seconds, 35 seconds, 38 seconds, 40 seconds, 43 seconds, 45 seconds, 48 seconds, 50 seconds, 53 seconds, 55 seconds, 58 seconds, 60 seconds, 65 seconds, 70 seconds, 75 seconds, 80 seconds, 85 seconds, 90 seconds, 95 seconds, 100 seconds, 110 seconds, 120 seconds, 150 seconds, 170 seconds, 190 seconds, 200 seconds, 210 seconds, 220 seconds, 250 seconds, 270 seconds, 290 seconds, 295 seconds.

Step a) may be carried out without solvent and may also be carried out in an inert solvent, e.g., the reactants are dissolved in an inert solvent respectively. The inert solvent is not particularly limited, as long as it does not adversely affect the progress of step a). For example, the inert solvent that may be used in step a) can be selected from one or more of benzenes solvents, amide solvents, hydrocarbon solvents, halohydrocarbon solvents, sulfone or sulfoxide solvents, ether solvents or ester solvents; preferably, the inert solvent is selected from one or more of chlorobenzene, trimethylbenzene, 1,4-dioxane, 1,2-dichloroethane, dimethyl sulfoxide, N-methylpyrrolidone, N,N-dimethylformamide, petroleum ether, n-heptane, tetrahydrofuran, methyltetrahydrofuran, benzene, toluene, ethyl acetate, and butyl acetate.

A base may be added at the beginning of, during and/or after the reaction of step a) to neutralize the acidic substances produced. The timing of adding the base is not particularly limited, as long as it may neutralize the acidic substances produced and does not adversely affect the progress of the process. For example, the base may be added to the first reactor set with various reactants simultaneously, may also be added to the first reactor set during the reaction, or may also be used for the neutralization in the first group of reactor or in another container or reactor after the completion of the reaction of step a). Base may be added in a continuous or intermittent manner, e.g., the ammonia gas is added continuously.

The base used in step a) may be an organic base or ammonia (ammonia gas) to absorb hydrogen halide. The organic base is preferably selected from organic amines, such as trimethylamine, dimethylethylamine, triethylamine, methyldiethylamine, pyridine or pyridine derivatives having 1 to 3 substituents linked to one or more carbon atoms of the heterocycle, piperidine or piperidine derivatives having 1 to 3 substituents linked to one or more carbon atoms of the heterocycle.

The molar ratio of the base to the compound of formula (II) used in step a) may be (0.8-10):1, e.g., greater than 1:1, for instance (1-2):1, such as 0.9:1, 1:1, 1.5:1, 2.0:1, 2.5:1, 3.0:1, 3.5:1, 4.0:1, 4.5:1, 5.0:1, 5.5:1, 6.0:1, 6.5:1, 7.0:1, 7.5:1, 8.0:1, 8.5:1, 9.0:1, 9.5:1, to neutralize the hydrogen halide produced.

In step a), the groups $Hal^1$ and $Hal^2$ in the compounds of formulae (II) and (V) are each independently halogen, such as F, Cl, Br, I.

For example, specific examples of the compound of formula (II) may be, but not limited to:
$CH_3$—P(Cl)—$OCH_2CH_3$,
$CH_3$—P(Br)—$OCH_2CH_3$,
$CH_3$—P(F)—$OCH_2CH_3$,
$CH_3CH_2$—P(Cl)—$OCH_2CH_3$,
$CH_3CH_2$—P(Br)—$OCH_2CH_3$,
$CH_3CH_2$—P(F)—$OCH_2CH_3$,
$CH_3$—P(Cl)—$OCH_2CH_2CH_3$,
$CH_3$—P(Br)—$OCH_2CH_2CH_3$,
$CH_3$—P(F)—$OCH_2CH_2CH_3$,
$CH_3$—P(Cl)—$OCH_2CH_2CH_2CH_3$,
$CH_3$—P(Br)—$OCH_2CH_2CH_2CH_3$,
$CH_3$—P(F)—$OCH_2CH_2CH_2CH_3$,
$CH_3$—P(Cl)—$OCH(CH_3)CH_3$,
$CH_3$—P(Br)—$OCH(CH_3)CH_3$, or
$CH_3$—P(F)—$OCH(CH_3)CH_3$.

For example, specific examples of the compound of formula (V) may be, but not limited to:

The first reactor set of step a) may consist of one or more reactors, e.g., may consist of one reactor, or may consist of two, three, four, five or more reactors. The types of reactors herein are not particularly limited, as long as the production may be carried out in a continuous manner. For example, the reactors used herein may be selected from microchannel reactors, stirred-tank reactors, tube reactors and tubular packed reactors. For example, the first reactor set consists of one or more microchannel reactors.

When the first reactor set consists of merely one reactor, it may be one microchannel reaction module (also referred to herein as one microchannel reactor), one stirred-tank reactor, one tube reactor or one tubular packed reactor.

When the first reactor set consists of more than one reactors, it may be formed by reactors of one type connected in parallel or in series, e.g., two, three, four, five or more microchannel reaction modules (or microchannel reactors) connected in parallel or in series, two, three, four, five or more stirred-tank reactors, tube reactors or tubular packed reactors connected in parallel or in series; it may also be formed by reactors of different types connected in parallel or in series, e.g., microchannel reaction modules and tube reactors connected in parallel or in series. In terms of the convenience of process operation, reactors of one type connected in parallel or in series can be selected, e.g., two, three, four, five or more microchannel reaction modules connected in parallel or in series, or two, three, four, five or more tube reactors connected in parallel or in series. The reaction conditions in various reactors may be the same or different, as long as they fall within the reaction conditions as described herein.

When the first reactor set consists of more than one reactors in series, the reaction time of step a) is calculated as the time taken by passing through all the reactors in series. For example, when two or more continuous flow reactors in series are used, the reaction time (i.e., the residence time) of step a) is calculated as the time taken by passing through all the continuous flow reactors in series.

When the first reactor set consists of more than one parallel reactors, the reaction time (or the residence time) of each parallel lines is calculated respectively, and the reaction time (or the residence time) of each parallel line satisfies the above range.

In step a), "product stream of the first reactor set" refers to the whole stream flowing out of the first reactor set, including reaction product(s), unreacted reactant(s), optional solvent(s), optional base(s), optional salt(s) generated by the neutralization reaction, and the like.

The product stream of the first reactor set obtained in step a) may or may not contain a compound of formula (VI):

Specific examples of the compound of formula (VI) can be, for example, but not limited to: $Hal^2$=Cl, X=ethoxy, $R_1$=methyl, and $R_7$=ethyl; or $Hal^2$=Cl, X=propoxy, $R_1$=methyl, and $R_7$=ethyl; or $Hal^2$=Cl, X=isopropoxy, $R_1$=methyl, and $R_7$=ethyl; or $Hal^2$=Cl, X=isopropoxy, $R_1$=methyl, and $R_7$=propyl.

Step b) of the Method of the First Aspect

In step b) of the method of the first aspect, the product stream of the first reactor set is fed into a second reactor set, reacting at a temperature in the range of from 50° C. to 200° C. to obtain a product stream of the second reactor set, wherein the feeding is preferably a continuous feeding.

The purpose of step b) is to maintain the product stream of the first reactor set at a relatively high temperature for a certain period of time. The inventors speculate that the compounds in the product stream of the first reactor set are rearranged in this step, resulting in the desired products.

The product stream of the first reactor set may be precooled or preheated prior to step b), thereby cooling or heating it to a temperature close to or equal to the reaction temperature of step b). Any cooling or heating device known in the art may be employed as the precooling or preheating device.

The product stream of the first reactor set entering into the step b) is preferably the same as the stream flowing out of the first reactor set. However, removing small amount of solvents or adding additional solvents between steps a) and b) are also encompassed in the scope of the present invention.

Step b) may be carried out without solvent and may also be carried out in an inert solvent. When an inert solvent is not used in step a), an inert solvent may be added in step b), and the description of the inert solvents in step a) above is applicable to the definition and selection of the inert solvents in step b). When an inert solvent is used in step a), the inert solvent of step a) is continued to be used in step b), and preferably no additional inert solvent is added in step b).

The description of the first reactor set in step a) above is applicable to the definition and selection scope of the second reactor set in step b). However, the first reactor set in step a) and the second reactor set in step b) may be the same or different. For example, the second reactor set may consist of one or more microchannel reactors or one or more stirred-tank reactors.

The temperature of step b) may be in the range of 50-200° C., such as 55° C., 65° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C.

The reaction time of step b) is not particularly limited, as long as the reaction may be substantially completed from the viewpoint of production effect. For example, the reaction time of step b) may be in the range of 1 hour to 30 hours, such as 1.5 hours, 2 hours, 2.5 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours. The reaction time may be residence time in the case of continuous flow reactors such as microchannel reactors, tube reactors or tubular packed reactors.

The reaction temperature and time may be adjusted accordingly within the above range in accordance with the types of reactors used.

In step b), "product stream of the second reactor set" refers to the whole stream flowing out of the second reactor set, including reaction product(s), unreacted reactant(s), optional solvent(s), optional base(s), optional salt(s) generated by the neutralization reaction, and the like.

The product stream of the second reactor set obtained in step b) may or may not contain a compound of formula (VII):

(VII)

Specific examples of the compound of formula (VII) may be, for example, but not limited to: $R_1$=methyl and X=ethoxy, or $R_1$=methyl and X=propoxy; or $R_1$=methyl and X=isopropoxy.

Step c) of the Method of the First Aspect

In step c) of the method of the first aspect, the product stream of the second reactor set is subjected to an acidic hydrolysis or a basic hydrolysis.

The product stream of the second reactor set entering into the step c) is preferably the same as the stream flowing out of the second reactor set. However, removing small amount of solvents or adding additional solvents between steps b) and c) are also encompassed in the scope of the present invention.

The reactors of step c) are not particularly limited, and the step c) may be carried out in the second reactor set, and may also be carried out in a new additional one or more reactors. Conventional reactors used for acidic hydrolysis or basic hydrolysis in the art may be employed in the present invention.

The product stream of the second reactor set may be precooled or preheated prior to step c), thereby cooling or heating it to a temperature close to or equal to the reaction temperature of step c). Any cooling or heating device known in the art may be employed as the precooling or preheating device.

The acidic hydrolysis of step c) may be carried out using an inorganic or organic acid, e.g., hydrochloric acid or sulfuric acid. The basic hydrolysis of step c) may be carried out using an inorganic or organic base, e.g., alkali metal hydroxides, alkaline earth metal hydroxides, alkali metal carbonates, alkaline earth metal carbonates, alkali metal bicarbonates or alkaline earth metal bicarbonates, such as NaOH, KOH or Ba(OH)$_2$.

The reaction temperature of step c) may be in the range of 20-150° C., such as 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C.

The reaction time of step c) is not particularly limited, as long as the hydrolysis is substantially completed from the viewpoint of production effect. For example, the hydrolysis time of step c) may be in the range of 2-24 hours, such as 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours. The reaction time may be residence time in the case of continuous flow reactors such as microchannel reactors, tube reactors or tubular packed reactors.

When PG in the compound of formula (V) is an amino protecting group, a step of removing the amino protecting group is further comprised. The methods commonly used for removing amino protecting groups in the art may be employed in the present invention.

Method of the Second Aspect

Step $a_0$) of the Method of the Second Aspect

In step $a_0$) of the method of the second aspect, the compounds of formulae (III) and (IV) are fed into a $A_0$ reactor set, after reaction, a product stream of the $A_0$ reactor set is obtained, wherein the feeding is preferably a continuous feeding.

In step $a_0$), it is theoretically assumed that the reaction is carried out as follows:

In step $a_0$), the molar ratio of the compound of formula (III) to the compound of formula (IV) is 1.5:1-1:1.5, such as 1.4:1, 1.3:1, 1.2:1, 1.1:1, 1:1, 1:1.1, 1:1.2, 1:1.3, 1:1.4.

Step $a_0$) may be carried out in a wide temperature range, e.g., in the range of −50° C. to 100° C., e.g., −20° C. to 20° C., such as −45° C., −40° C., −35° C., −30° C., −25° C., −20° C., −15° C., −10° C., −5° C., 0° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C.

The compounds of formulae (III) and (IV) may be optionally precooled or preheated prior to entering into the $A_0$ reactor set, thereby cooling or heating the streams of compounds of formulae (III) and (IV) to a temperature close to or equal to the reaction temperature of step $a_0$). Any cooling or heating device known in the art may be employed as the precooling or preheating device.

The reaction time of step $a_0$) may be adjusted in a wide range, e.g., in the range of 1 second to 10 hours, such as 3 seconds, 4 seconds, 5 seconds, 7 seconds, 8 seconds, 10 seconds, 13 seconds, 15 seconds, 18 seconds, 20 seconds, 23 seconds, 25 seconds, 28 seconds, 30 seconds, 33 seconds, 35 seconds, 38 seconds, 40 seconds, 43 seconds, 45 seconds, 48 seconds, 50 seconds, 53 seconds, 55 seconds, 58 seconds, 1 minute, 1.3 minutes, 1.5 minutes, 1.8 minutes, 2.0 minutes, 2.3 minutes, 2.5 minutes, 2.8 minutes, 3.0 minutes, 3.3 minutes, 3.5 minutes, 3.8 minutes, 4 minutes, 4.5 minutes, 5 minutes, 5.5 minutes, 6.0 minutes, 6.5 minutes, 7.0 minutes, 7.5 minutes, 8.0 minutes, 8.5 minutes, 9.0 minutes, 9.5 minutes, 10 minutes, 15 minutes, 20 minutes, 25 minutes, 30 minutes, 35 minutes, 40 minutes, 45 minutes, 50 minutes, 55 minutes, 1.0 hour, 1.5 hours, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, 8.0 hours, 8.5 hours, 9.0 hours, 9.5 hours.

In particular, when the $A_0$ reactor set in step $a_0$) consists of microchannel reactors, the reaction time may be adjusted in the range of 1-300 seconds, e.g., 1-30 seconds, such as 1 second, 2 seconds, 5 seconds, 7 seconds, 8 seconds, 9 seconds, 10 seconds, 13 seconds, 15 seconds, 18 seconds, 20 seconds, 23 seconds, 25 seconds, 28 seconds, 30 seconds, 33 seconds, 35 seconds, 38 seconds, 40 seconds, 43 seconds, 45 seconds, 48 seconds, 50 seconds, 53 seconds, 55 seconds, 58 seconds, 60 seconds, 65 seconds, 70 seconds, 75 seconds, 80 seconds, 85 seconds, 90 seconds, 95 seconds, 100 seconds, 110 seconds, 120 seconds, 150 seconds, 170 seconds, 190 seconds, 200 seconds, 210 seconds, 220 seconds, 250 seconds, 270 seconds, 290 seconds, 295 seconds.

The reaction time may be residence time in the case of continuous flow reactors such as microchannel reactors, tube reactors or tubular packed reactors.

Step $a_0$) may be carried out without solvent and may also be carried out in an inert solvent. The description of the inert solvents in step a) of the method of the first aspect is applicable to the definition and selection scope of the inert solvents in step $a_0$).

The description of the first reactor set in step a) of the method of the first aspect is applicable to the definition and selection scope of the $A_0$ reactor set in step $a_0$). The $A_0$ reactor set preferably consists of one or more continuous flow reactors in series or in parallel, such as microchannel reactors, tube reactors or tubular packed reactors.

In step $a_0$), the group Hal in the compound of formula (III) is halogen, such as F, Cl, Br, I.

In the compounds of formulae (III) and (IV), $R_3$, $R_4$, $R_5$ and $R_6$ are each independently selected from a substituted or unsubstituted hydrocarbyl group, such as a substituted or unsubstituted alkyl group, a substituted or unsubstituted aryl group, a substituted or unsubstituted cycloalkyl group, a substituted or unsubstituted alkaryl group, and a substituted or unsubstituted aralkyl group; for example, $R_3$, $R_4$, $R_5$ and $R_6$ are each independently selected from a substituted or unsubstituted $C_1$-$C_6$ alkyl group, a substituted or unsubstituted $C_6$-$C_{12}$ aryl group, a substituted or unsubstituted $C_3$-$C_{10}$ cycloalkyl group, a substituted or unsubstituted $C_7$-$C_{12}$ alkaryl group, and a substituted or unsubstituted $C_7$-$C_{12}$ aralkyl group; for example, $R_3$, $R_4$, $R_5$ and $R_6$ are each independently selected from methyl, ethyl, propyl, isopropyl, butyl, isobutyl, pentyl, hexyl, phenyl, phenylmethyl, phenylethyl, phenylpropyl, methylphenyl, ethylphenyl, propylphenyl. Preferably, $R_3$=$R_4$. Preferably, $R_5$=$R_6$.

For example, the specific examples of the compound of formula (III) may be, but are not limited to, $CH_3$—$PCl_2$, $CH_3$—$PBr_2$, $CH_3$—$PF_2$, $CH_3CH_2$—$PCl_2$, $CH_3CH_2$—$PBr_2$, $CH_3CH_2$—$PF_2$.

For example, the specific examples of the compound of formula (IV) may be, but not limited to:
$CH_3CH_2O$—$P(CH_3)$—$OCH_2CH_3$,
$CH_3CH_2CH_2O$—$P(CH_3)$—$OCH_2CH_2CH_3$,
$CH_3CH_2CH_2CH_2O$—$P(CH_3)$—$OCH_2CH_2CH_2CH_3$,
$CH_3(CH_3)CHO$—$P(CH_3)$—$OCH(CH_3)CH_3$,
$CH_3(CH_3)CHCH_2O$—$P(CH_3)$—$OCH_2CH(CH_3)CH_3$,
$CH_3CH_2O$—$P(CH_2CH_3)$—$OCH_2CH_3$,
$CH_3CH_2CH_2O$—$P(CH_2CH_3)$—$OCH_2CH_2CH_3$,
$CH_3CH_2CH_2CH_2O$—$P(CH_2CH_3)$—$OCH_2CH_2CH_2CH_3$,
$CH_3(CH_3)CHO$—$P(CH_2CH_3)$—$OCH(CH_3)CH_3$, or
$CH_3(CH_3)CHCH_2O$—$P(CH_2CH_3)$—$OCH_2CH(CH_3)CH_3$.

In step $a_0$), "product stream of the $A_0$ reactor set" refers to the whole stream flowing out of the $A_0$ reactor set, including reaction product(s), unreacted reactant(s), optional solvent(s), and the like.

Step a) of the Method of the Second Aspect

In step a) of the method of the second aspect, the product stream of the $A_0$ reactor set and the compound of formula (V) are fed into a first reactor set, after reaction, a product stream of the first reactor set is obtained, wherein the feeding is preferably a continuous feeding.

(V)

The product stream of the $A_0$ reactor set entering into the step a) is preferably the same as the stream flowing out of the $A_0$ reactor set. However, removing small amount of solvents or adding additional solvents between steps $a_0$) and a) are also encompassed in the scope of the present invention.

In step a) of the method of the second aspect, the molar ratio of the compound of formula (V) to the total molar amount of P-containing compounds in terms of P in the product stream of the $A_0$ reactor set is 1:(0.8-10), e.g. 1:(1-3), such as 1:0.9, 1:1.0, 1:1.2, 1:1.5, 1:1.7, 1:2.0, 1:2.2, 1:2.5, 1:2.7, 1:3.0, 1:3.2, 1:3.5, 1:3.7, 1:4.0, 1:4.2, 1:4.5, 1:4.7, 1:5.0, 1:5.2, 1:5.5, 1:5.7, 1:6.0, 1:6.2, 1:6.5, 1:6.7, 1:7.0, 1:7.2, 1:7.5, 1:7.7, 1:8.0, 1:8.2, 1:8.5, 1:8.7, 1:9.0, 1:9.2, 1:9.5, 1:9.7.

When feeding continuously, the product stream of the $A_0$ reactor set and the compound of formula (V) may be fed into the first reactor set simultaneously, and the product stream of the $A_0$ reactor set and/or the compound of formula (V) may be fed into the first reactor set in portions at different time points and/or at different feeding sites respectively, as long as flowing out of the first reactor set continuously after the reaction of the two in the first reactor set is completed.

The product stream of the $A_0$ reactor set and the compound of formula (V) may be optionally precooled or preheated prior to entering into the first reactor set, thereby cooling or heating the product stream of the $A_0$ reactor set and the stream of the compound of formula (V) to a temperature close to or equal to the reaction temperature of step a). Any cooling or heating device known in the art may be employed as the precooling or preheating device.

The molar ratio of the base used in step a) to the total molar amount of P-containing compounds in terms of P in the product stream of the $A_0$ reactor set may be (0.8-10):1, e.g., greater than 1:1, for instance (1-2):1, such as 0.9:1, 1:1, 1.5:1, 2.0:1, 2.5:1, 3.0:1, 3.5:1, 4.0:1, 4.5:1, 5.0:1, 5.5:1, 6.0:1, 6.5:1, 7.0:1, 7.5:1, 8.0:1, 8.5:1, 9.0:1, 9.5:1, to neutralize the hydrogen halide produced.

Step a) of the method of the second aspect corresponds to step a) of the method of the first aspect, wherein all other descriptions of step a) of the method of the first aspect are applicable in the step a) of the method of the second aspect, except that the product stream of the $A_0$ reactor set in step a) of the method of the second aspect is different from the compound of formula (II) in step a) of the method of the first aspect in expression.

Steps b) and c) of the Method of the Second Aspect

All descriptions of steps b) and c) of the method of the first aspect are applicable in steps b) and c) of the method of the second aspect.

In the methods of the present invention, the glufosinate of formula (I) or analogues thereof may be in the L configuration or D configuration or a mixture of the L and D configurations.

EXAMPLES

The technical solutions of the present invention are further described below in combination with specific examples, but the present invention is not limited to the following examples. The conditions employed in examples may be further adjusted according to specific requirements, and the implementation conditions unindicated are conventional experimental conditions.

Example A1

A solution of methyldichlorophosphine (hereinafter referred to as MDP, density: about 1.2 g/ml) at a concentration of 25 wt. % in chlorobenzene and a solution of methyldiethoxyphosphine (hereinafter referred to as MDEP, density: about 1.012 g/ml) at a concentration of 25 wt. % in chlorobenzene were prepared, respectively.

Figure 1:
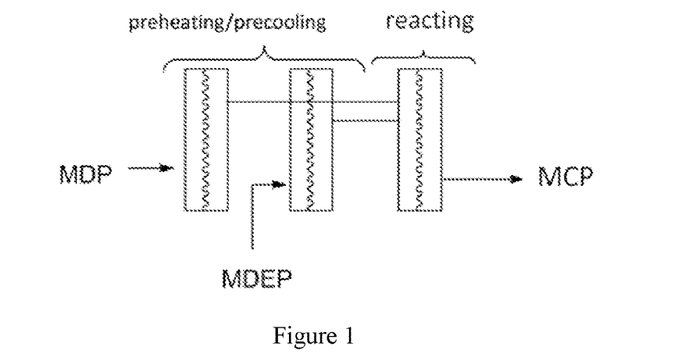
FIGS. 1 to 5 schematically illustrate several exemplary flow sheets according to embodiments of the present invention.

A schematic diagram of the reaction process is shown in FIG. 1. The MDP and MDEP solutions above were passed through two parallel microchannel reactors (about 8.5 mL in volume) at feed rates of 20 g/min and 25.6 g/min (the molar ratio of MDP:MDEP=1:1) respectively and cooled to 10° C. The MDP and MDEP solutions were then fed into another microchannel reactor (about 8.5 mL in volume) simultaneously and reacted at 10° C., the residence time was 12 seconds, and the production of chloromethylethoxyphosphine (hereinafter referred to as MCP), which was the reaction product, was detected using the nuclear magnetism.

$^1$H NMR (D20 external standard, 43 MHz) δ: 3.92-2.96 (m, 2H), 1.31 (d, J=12.8 Hz, 3H), 0.84 (t, J=7.0 Hz, 3H).

Examples B1 to B11: Preparation of L-Glufosinate Hydrochloride

A solution of MDP at a concentration of 10 wt. % in chlorobenzene, a solution of MDEP at a concentration of 10 wt. % in chlorobenzene, and a solution of $H_3$ at a concentration of 10 wt. % in chlorobenzene were prepared, respectively.

Figure 2:
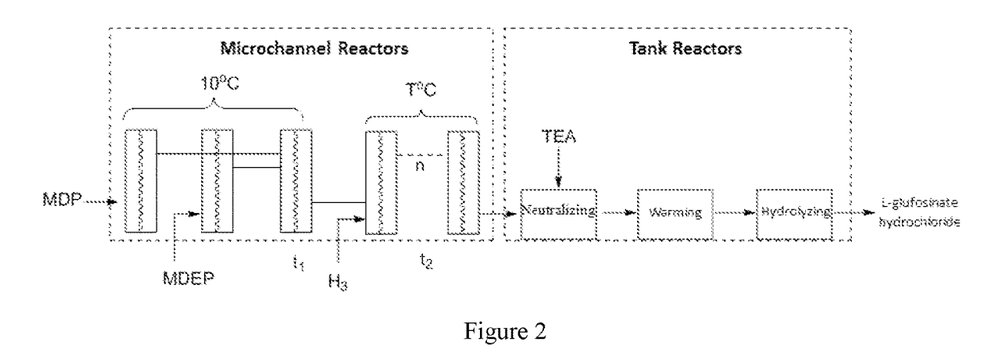

A schematic diagram of the reaction process is shown in FIG. 2. The MDP and MDEP solutions above were passed through two parallel microchannel reactors at the rates shown in Table 2 below respectively and cooled to 10° C. The MDP and MDEP solutions were then fed into another microchannel reactor simultaneously and reacted at 10° C., the reaction conditions are shown in Table 2 below, and the residence time was t1. The obtained MCP product stream and the $H_3$ solution above at flow rates listed in Table 2 below were then fed into another group of two microchannel reactors in series, the reaction conditions are shown in Table 2 below, the reaction temperature was T, and the residence time was t2. Subsequently, the reaction solution flowing out of the microchannel reactors was neutralized with triethylamine (TEA). The resulting reaction solution was then warmed to 90° C. for a period of 8 hours, and then hydrolyzed with hydrochloric acid at 100° C. to obtain L-glufosinate hydrochloride.

Absolute yield of reaction solution=the absolute mass of products in reaction solution measured by liquid-phase external standard method/theoretical output.

Separation yield=the mass of products obtained by post-processing crystallization/theoretical output.

TABLE 2

| No. | MDP g/min | MDEP g/min | $H_3$ g/min | Molar ratio of MDP:MDEP:$H_3$:TEA | T ° C. | Residence time t1/s | Residence time t2/s | Absolute yield of reaction solution % | Separation yield % |
|---|---|---|---|---|---|---|---|---|---|
| B1 | 5.34 | 6.83 | 15 | 1.05:1.05:2:2.4 | 10 | 46.7 | 42.3 | — | 55 |
| B2 | 5.34 | 6.83 | 15 | 1.05:1.05:2:2.4 | 30 | 46.7 | 42.3 | — | 52 |
| B3 | 5.34 | 6.83 | 15 | 1.05:1.05:2:2.4 | 50 | 46.7 | 42.3 | — | 52 |
| B4 | 5.34 | 6.83 | 15 | 1.05:1.05:2:2.4 | 80 | 46.7 | 42.3 | — | 47 |
| B5 | 5.34 | 6.83 | 15 | 1.05:1.05:2:2.4 | −20 | 46.7 | 63.3 | — | 60.5 |

TABLE 2-continued

| No. | MDP g/min | MDEP g/min | H$_3$ g/min | Molar ratio of MDP:MDEP:H$_3$:TEA | T °C. | Residence time t1/s | Residence time t2/s | Absolute yield of reaction solution % | Separation yield % |
|---|---|---|---|---|---|---|---|---|---|
| B6  | 10.68 | 13.66 | 30 | 1.05:1.05:2:2.4 | −20 | 23.3 | 31.6  | —    | 52.3 |
| B7  | 21.35 | 27.32 | 60 | 1.05:1.05:2:2.4 | −20 | 11.6 | 15.8  | —    | 49   |
| B8  | 5.34  | 6.83  | 15 | 1.05:1.05:2:2.4 | −20 | 46.7 | 21.1  | 78.4 | —    |
| B9  | 5.34  | 6.83  | 15 | 1.05:1.05:2:2.4 | −10 | 46.7 | 80.2  | 69   | —    |
| B10 | 5.34  | 6.83  | 15 | 1.05:1.05:2:2.4 | 0   | 46.7 | 80.2  | 76.6 | —    |
| B11 | 5.34  | 6.83  | 15 | 1.05:1.05:2:2.4 | 0   | 46.7 | 122.4 | 77.3 | —    |

Notes:
Each microchannel reactor had a volume of about 8.5 mL. The MDP solution had a density of about 1.16 g/ml, the MDEP solution had a density of about 1.084 g/ml, and the H$_3$ solution had a density of about 1.136 g/ml.

The mass spectrometric and nuclear magnetic data of the L-glufosinate hydrochloride obtained in Examples B1-B11 were as follows:

MS (ESI): m/z [M+H]$^+$ calculated for C$_5$H$_{13}$NO$_4$P: 182.05; found: 182.1.

$^1$H NMR (D20, 400 MHz) δ: 4.08 (t, J=6.2 Hz, 1H), 2.11 (dddd, J=14.6, 11.0, 8.7, 6.0 Hz, 2H), 1.99-1.73 (m, 2H), 1.44 (d, J=14.2 Hz, 3H).

$^{13}$C NMR (D20, 100 MHz) δ: 171.0, 52.8, 52.6, 25.5, 24.6, 22.6, 22.5, 13.9, 13.0.

$^{31}$P NMR (D20, 160 MHz) δ: 53.8.

Example C1: Preparation of L-Glufosinate Hydrochloride

A solution of MDP at a concentration of 20 wt. % in chlorobenzene, a solution of MDEP at a concentration of 20 wt. % in chlorobenzene, and a solution of H$_3$ at a concentration of 20 wt. % in chlorobenzene and triethylamine were prepared, respectively.

Figure 3:
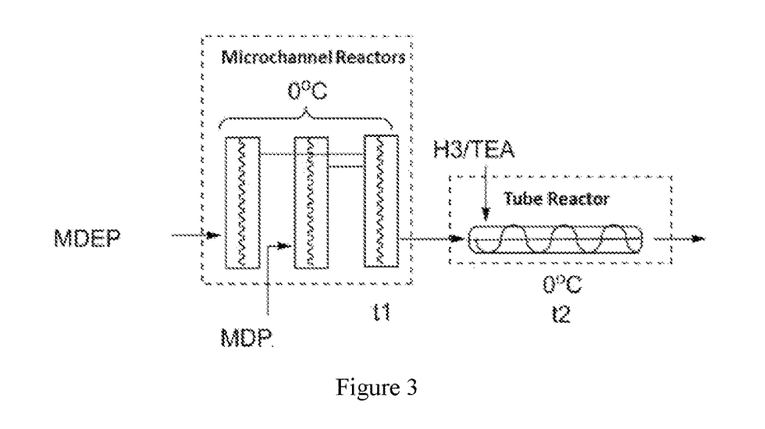

A schematic diagram of the reaction process is shown in FIG. 3. The MDP and MDEP solutions above were passed through two parallel microchannel reactors at the rates shown in Table 3 below respectively and cooled to 10° C. The MDP and MDEP solutions were then fed into another microchannel reactor simultaneously and reacted at 10° C., the reaction conditions are shown in Table 3 below, the residence time being t1. The obtained MCP product stream and the H$_3$ solution above at flow rates listed in Table 3 below were then fed into a tube reactor, the reaction conditions are shown in Table 3 below, the reaction temperature was 0° C., and the residence time was t2. Subsequently, the reaction solution flowing out of the tube reactor was warmed to 90° C. for a period of 8 hours, and then hydrolyzed with hydrochloric acid at 100° C. to obtain L-glufosinate hydrochloride.

Examples D1 to D6: Preparation of L-Glufosinate Hydrochloride

A solution of MDP at a concentration of 10 wt. % in dichloroethane, a solution of MDEP at a concentration of 10 wt. % in dichloroethane, and a solution of H$_3$ at a concentration of 10 wt. % in dichloroethane were prepared, respectively.

Figure 4:
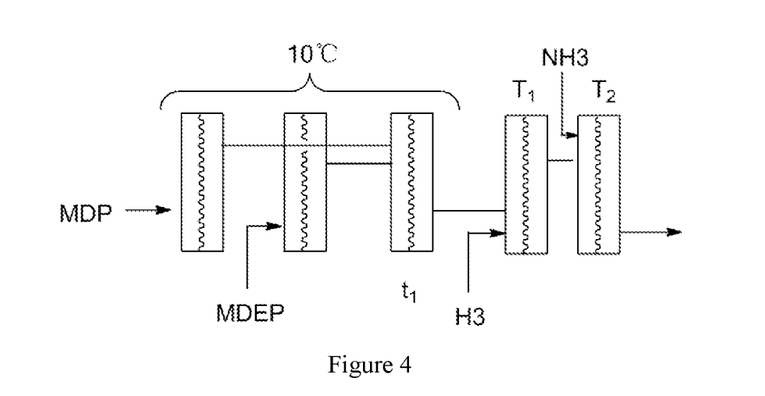

A schematic diagram of the reaction process is shown in FIG. 4. The MDP and MDEP solutions were passed through two parallel microchannel reactors at the rates shown in Table 4 below respectively and cooled to 10° C. The MDP and MDEP solutions were then fed into another microchannel reactor simultaneously and reacted at 10° C., the reaction conditions are shown in Table 4 below, and the residence time was t1. The obtained MCP product stream and the H$_3$ solution above at flow rates listed in Table 4 below were then fed into a first microchannel reactor of another group of two microchannel reactors in series (the reaction temperature was T1). The stream flowing out of the first microchannel reactor was fed into a second microchannel reactor together with ammonia gas (the reaction temperature was T2), and the reaction conditions are shown in Table 4 below. Subsequently, the reaction solution flowing out of the microchannel reactor was warmed to 90° C. for a period of 8 hours, and then hydrolyzed with hydrochloric acid at 100° C. to obtain L-glufosinate hydrochloride.

TABLE 3

| No. | MDP g/min | MDEP g/min | H$_3$ g/min | Molar ratio of MDP:MDEP:H3:TEA | residence time t1/s | residence time t2/s | Separation yield % |
|---|---|---|---|---|---|---|---|
| C1 | 18.96 | 22.28 | 50 | 1.05:1.05:2:2.4 | 13.2 | 1003 | 66 |

Notes:
Each microchannel reactor had a volume of about 8.5 mL, and the tube reactor had a volume of 1.4 L. The MDP solution had a density of about 1.19 g/ml, the MDEP solution had a density of about 1.037 g/ml, and the H$_3$ solution had a density of about 1.11 g/ml.

TABLE 4

| No. | MDP g/min | MDEP g/min | H₃ g/min | NH₃ ml/min | MDP:MDEP:H₃ | T1 °C. | T2 °C. | residence time t1/s | Separation yield % |
|---|---|---|---|---|---|---|---|---|---|
| D1 | 5.34 | 6.83 | 15 | >1000 | 1.05:1.05:2 | −20 | −20 | 46.7 | 40.5 |
| D2 | 5.34 | 6.83 | 15 | >1000 | 1.05:1.05:2 | −20 | 20 | 46.7 | 33.3 |
| D3 | 5.34 | 6.83 | 15 | >1000 | 1.05:1.05:2 | −20 | 50 | 46.7 | 38 |
| D4 | 5.34 | 6.83 | 15 | >1000 | 1.05:1.05:2 | −10 | 20 | 46.7 | 41.3 |
| D5 | 5.34 | 6.83 | 15 | >1000 | 1.05:1.05:2 | 0 | 20 | 46.7 | 35 |
| D6 | 5.34 | 6.83 | 15 | >1000 | 1.05:1.05:2 | 20 | 20 | 46.7 | 41 |

Notes:
Each microchannel reactor had a volume of about 8.5 mL. The MDP solution had a density of about 1.16 g/ml, the MDEP solution had a density of about 1.084 g/ml, and the H₃ solution had a density of about 1.136 g/ml.

Examples E1 to E10: Preparation of L-Glufosinate Hydrochloride

The methods were the same as those in Examples D1-D6, except replacing the dichloroethane with chlorobenzene as solvent.

TABLE 5

| No. | MDP g/min | MDEP g/min | H₃ g/min | NH₃ ml/min | MDP:MDEP:H₃ | T1 °C. | T2 °C. | Residence time t1/s | Absolute yield of reaction solution % |
|---|---|---|---|---|---|---|---|---|---|
| E1 | 5.34 | 6.83 | 15 | >1000 | 1.05:1.05:2 | 20 | 20 | 46.7 | 55 |
| E2 | 5.34 | 6.83 | 15 | >1000 | 1.05:1.05:2 | 5 | 20 | 46.7 | 45 |
| E3 | 5.34 | 6.83 | 15 | >1000 | 1.05:1.05:2 | −5 | 20 | 46.7 | 60 |
| E4 | 5.34 | 6.83 | 15 | >1000 | 1.05:1.05:2 | −20 | 20 | 46.7 | 52 |
| E5 | 5.34 | 6.83 | 15 | 223 | 1.05:1.05:2 | −5 | 20 | 46.7 | 69 |
| E6 | 5.34 | 6.83 | 15 | 446 | 1.05:1.05:2 | −5 | 20 | 46.7 | 53 |
| E7 | 5.34 | 6.83 | 15 | 223 | 1.05:1.05:2 | −5 | 20 | 46.7 | 68 |
| E8 | 5.34 | 6.83 | 15 | 264 | 1.05:1.05:2 | −5 | 20 | 46.7 | 79.1 |
| E9 | 5.34 | 6.83 | 15 | 203 | 1.05:1.05:2 | −5 | 20 | 46.7 | 73.6 |
| E10 | 5.34 | 6.83 | 15 | 183 | 1.05:1.05:2 | −5 | 20 | 46.7 | 71.4 |

Examples E801 to E808

The methods were the same as those in Example 8 of Table 5, except that after the second microchannel reactor, the reaction solution flowing out of the microchannel reactor was warmed to a temperature as shown in Table 5-1 for a period of time shown in Table 5-1, and then hydrolyzed with hydrochloric acid at 100° C. to obtain L-glufosinate hydrochloride.

TABLE 5-1

| No. | Reaction temperature (° C.) | Reaction time | Separation yield of L-glufosinate | L-glufosinate ee |
|---|---|---|---|---|
| E801 | 60 | 15 h | 65% | 97% |
| E802 | 80 | 15 h | 74% | 99% |
| E803 | 100 | 15 h | 74% | 97% |
| E804 | 120 | 15 h | 78% | 97% |
| E805 | 140 | 15 h | 78% | 97% |
| E806 | 90 | 4 h | 72% | 97% |
| E807 | 90 | 8 h | 77% | 97% |
| E808 | 90 | 15 h | 77% | 97% |

Examples F1 to F2: Preparation of L-Glufosinate Hydrochloride

The methods were the same as that in Example E8, except replacing H₃ with:

The Separation yields of products in Examples F1 and F2 were 52% and 66%, respectively.

Examples G1 to G2: Preparation of L-Glufosinate Hydrochloride

A solution of MCP at a concentration of 10 wt. % in chlorobenzene and a solution of H₃ at a concentration of 10 wt. % in chlorobenzene were prepared.

Figure 5:
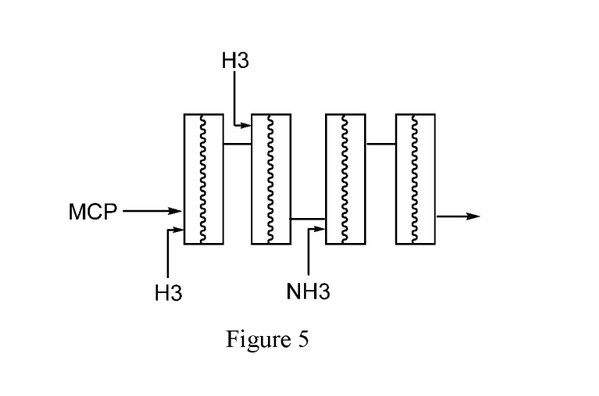

A schematic diagram of the reaction process is shown in FIG. 5. The MCP solution above and a portion of the H₃ solution above at flow rates listed in the Table 6 below were fed into a microchannel reactor and reacted, the reaction conditions are shown in Table 6 below, the reaction temperature was T, and the residence time was t1. Subsequently, the obtained reaction solution and the other portion of H₃ solution were fed into a next group of one microchannel reactor in series and reacted under the conditions shown in

Table 6 below, and the residence time was t2. The obtained reaction solution was then fed into a next group of one microchannel reactor in series together with ammonia gas for neutralization. The reaction solution flowing out of the microchannel reactor was then warmed to 90° C. for a period of 8 hours, and then hydrolyzed with hydrochloric acid at 100° C. to obtain L-glufosinate hydrochloride.

TABLE 6

| No. | MCP g/min | The first portion of $H_3$ g/min | The second portion of $H_3$ g/min | $NH_3$ ml/min | MCP:$H_3$:$NH_3$ | T ° C. | residence time t1/s | residence time t2/s | Absolute yield of reaction solution % |
|---|---|---|---|---|---|---|---|---|---|
| G1 | 18.9 | 10 | 10 | 349 | 1.2:1:1.4 | −5 | 24.7 | 13.3 | 89 |
| G2 | 20.5 | 10 | 10 | 374 | 1.3:1:1.5 | −5 | 24.7 | 13.3 | 82 |

What is claimed is:

1. A method for preparing a glufosinate of formula (I) or an analogue thereof, (I)

which method comprises:
a) feeding a compound of formula (II) and a compound of formula (V) into a first reactor set, wherein after reaction, a product stream of the first reactor set is obtained, (II)

(V)

b) feeding the product stream of the first reactor set into a second reactor set, and reacting the product stream at a temperature in the range of from 50° C. to 200° C. to obtain a product stream of the second reactor set; and
c) subjecting the product stream of the second reactor set to an acidic hydrolysis or a basic hydrolysis to obtain the glufosinate of formula (I) or an analogue thereof;
wherein X represents —$OR_2$ or —$NR_2R'$,
$R_1$, $R_2$ and $R_7$ are each independently selected from a substituted or unsubstituted hydrocarbyl group;
R' is hydrogen or has the same definition as $R_2$;
$Hal^1$ and $Hal^2$ are each independently halogen; and
PG is hydrogen or an amino protecting group; and
wherein the feeding in the step a) and/or step b) is/are a continuous feeding.

2. The method of claim 1, wherein in step a), a molar ratio of the compound of formula (V) to the compound of formula (II) is 1:(0.8-10).

3. The method of claim 1, wherein a product stream of an $A_0$ reactor set obtained from the following step $a_0$) is used as the compound of formula (II),
$a_0$) feeding a compound of formula (III) and a compound of formula (IV) into the $A_0$ reactor set, after reaction, the product stream of the $A_0$ reactor set is obtained;

wherein $Hal^1$ is the same as in claim 1, and
$R_3$, $R_4$, $R_5$, and $R_6$ are each independently selected from a substituted or unsubstituted hydrocarbyl group.

4. The method of claim 3, wherein in step $a_0$), a molar ratio of the compound of formula (III) to the compound of formula (IV) is 1.5:1-1:1.5.

5. The method of claim 3, wherein step $a_0$) has a reaction temperature in the range of from −50° C. to 100° C.

6. The method of claim 1, wherein step a) has a reaction temperature in the range of from −50° C. to 200° C.

7. The method of claim 1, wherein step b) has a reaction time in the range of from 1 hour to 30 hours.

8. The method of claim 3, wherein the $A_0$ reactor set consists of one or more microchannel reactors.

9. The method of claim 1, wherein the first reactor set consists of one or more microchannel reactors, and/or the second reactor set consists of one or more microchannel reactors or one or more stirred-tank reactors.

10. The method of claim 3, wherein in step a), a molar ratio of the compound of formula (V) to the total molar amount of P-containing compounds in terms of P in the product stream of the $A_0$ reactor set is 1:(0.8-10).

11. The method of claim 1, wherein a base is added at the beginning of, during and/or after the reaction of step a).

12. The method of claim 3, wherein steps a), b), c) and $a_0$) are each independently carried out without solvent or in an inert solvent.

13. The method of claim 3, wherein the feeding in the step $a_0$) is a continuous feeding.

14. The method of claim 9, wherein the reaction time in the first reactor set is in the range of 1-300 seconds.

15. The method of claim 8, wherein the reaction time in the $A_0$ reactor set is in the range of 1-300 seconds.

16. The method of claim 1, wherein PG in compound (V) is an amino protecting group, and the method includes a step wherein the amino protecting group is removed.

17. The method of claim 1, wherein $R_1$, $R_2$ and $R_7$ are each independently selected from methyl, ethyl, propyl, isopropyl, butyl, isobutyl, pentyl, hexyl, phenyl, phenylmethyl, phenylethyl, phenylpropyl, methylphenyl, ethylphenyl, and propylphenyl.

18. The method of claim 1, wherein $R_1$ is selected from methyl and ethyl, and $R_2$ is selected from methyl, ethyl, propyl, isopropyl, butyl and isobutyl.

19. The method of claim 1, wherein $Hal^1$ and $Hal^2$ are chlorine.

20. The method of claim 1, wherein b) comprises feeding the product stream of the first reactor set into a second reactor set, reacting the product stream in the second reactor set at a temperature in the range of from 80° C. to 130° C. thereby obtaining a product stream of the second reactor set.

21. The method of claim 3, wherein $R_3$, $R_4$, $R_5$ and $R_6$ are each independently selected from methyl, ethyl, propyl, isopropyl, butyl, isobutyl, pentyl, hexyl, phenyl, phenylmethyl, phenylethyl, phenylpropyl, methylphenyl, ethylphenyl, and propylphenyl.

* * * * *